June 24, 1930. W. J. CROWELL, JR 1,766,980
COMBUSTION CONTROL APPARATUS
Original Filed Oct. 9, 1920
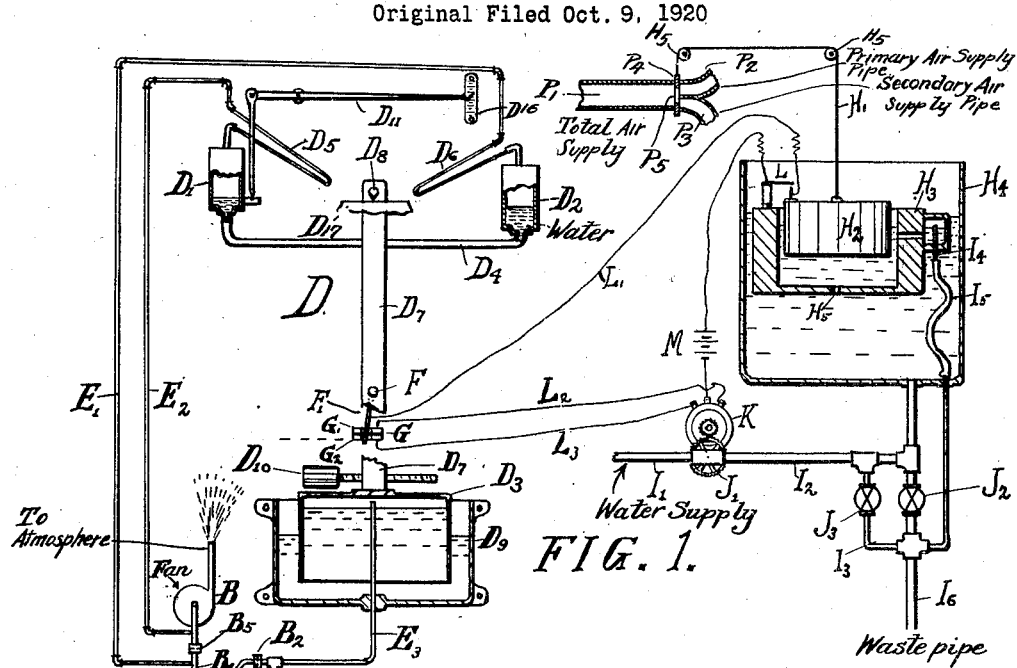
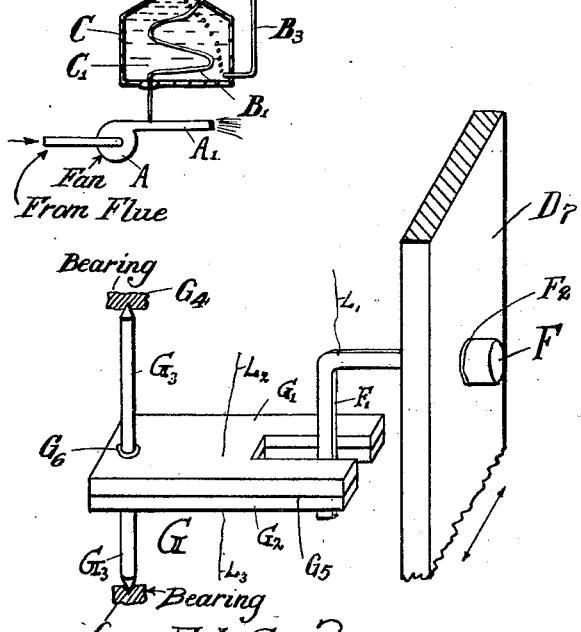
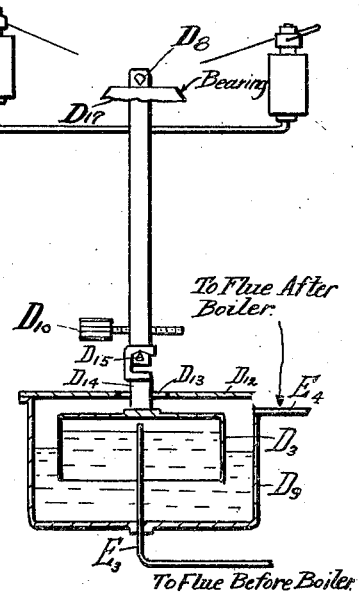
Witnesses:
Christian C. Crowell
Robert C. Crowell.
Inventor:
Wm J. Crowell Jr Patented June 24, 1930

1,766,980

UNITED STATES PATENT OFFICE

WILLIAM JAMES CROWELL, JR., OF WYNCOTE, PENNSYLVANIA

COMBUSTION CONTROL APPARATUS

Application filed October 9, 1920, Serial No. 415,945. Renewed May 12, 1927.

The object of my present invention is to provide a relatively simple apparatus by means of which there may be such automatic control of the air supplied to a furnace as will result in the most advantageous gaseous mixture in the furnace.

In accomplishing this result my differential ratio meter, U. S. Patent No. 1,308,626, of July 1, 1919, is connected to act as an improved $CO_2$ meter, as hereinafter explained, or as an improved "boiler efficiency" meter as hereinafter explained. A continuous periodic small and slow fluctuation is impressed on the position of a damper controlling the relative quantities of primary and secondary air, resulting in a continuous and slow periodic fluctuation in furnace conditions and a corresponding fluctuation in the position of the ratio balance. At the end of each periodic small fluctuation of the damper, an electric circuit changes slightly the average position of the damper, the direction of the small change being always such as to improve furnace conditions.

If the ratio balance is used as an improved $CO_2$ meter, furnace conditions automatically gravitate to any desired percentage of $CO_2$ in the flue gas, every periodic adjustment of the damper being in a direction to bring the desired percentage of $CO_2$ in the flue gas.

If the ratio balance is used as a "boiler efficiency" meter, then furnace conditions automatically gravitate to give maximum boiler efficiency.

Referring to the drawings,—Fig. 1 is a diagrammatic elevation of the invention, the ratio meter being connected as an improved $CO_2$ meter.

Fig. 2 is a perspective enlarged detail illustrating the electric connections at the balance.

Fig. 3 illustrates the ratio meter as an improved "boiler efficiency" meter.

Referring to Fig. 1, a fan A delivers a continuous stream of flue gas into the pipe $A_1$ at atmospheric pressure, the percentage of $CO_2$ in this flue gas being affected by the position of the damper controlling the relative quantities of primary and secondary air admitted to a furnace. A second fan, B, draws a small continuous supply of the flue gas from the pipe $A_1$ successively through a coil $B_1$ surrounded by a caustic solution $C_1$ within a chamber C, through a small orifice $B_2$, through a pipe $B_3$ delivering into the caustic solution $C_1$, in small bubbles through the caustic solution $C_1$ and through a pipe $B_4$ and a second small orifice $B_5$. The $CO_2$ of the continuous sample drawn by the fan B from the pipe $A_1$ is absorbed in the caustic solution $C_1$ and the ratio of the fall in pressure at the second small orifice $B_5$ to the fall in pressure at the first small orifice $B_2$ is a function of the percentage of $CO_2$ absorbed at $C_1$, so that a continuous record of this ratio (by the ratio recorder) on a suitable scale $D^{16}$ will be a record of $CO_2$ in the flue gas.

The differential pressure at the orifice $B_5$ is transmitted by means of the pressure connections $E_1$ and $E_2$ to the cylinder $D_1$ and $D_2$ of the ratio meter D, exerting a tilting moment, as described in specification of U. S. Patent No. 1,308,626 of July 1, 1919, proportional to the impressed differential form the orifice $B_5$. The differential or drop in pressure at the small orifice $B_2$ is equal to the suction or pressure below atmosphere after the orifice $B_2$, as transmitted by the pressure connection $E_3$ to the space above the liquid beneath the bell or inverted cup shaped receptacle $D_3$ of the ratio meter D, for the pressure before the orifice $B_2$ is sensibly atmospheric, the fan A discharging to atmosphere through a sufficiently large pipe $A_1$ and the bore of the pipe and coil $B_1$ being sufficiently large as compared with the size of the orifice $B_2$.

The ratio meter D comprises a U tube $D_1$ $D_4$ $D_2$ with flexible connections $D_5$ and $D_6$ rigidly fastened to a vertical arm $D_7$ pivoted at $D_8$ upon fixed bearing $D^{17}$ having rigidly attached to it at its lower end a bell or inverted cup-shaped receptable $D_3$ dipping into water or other liquid in a suitable stationary receptacle $D_9$ and having a screw counterweight $D_{10}$ near the lower end of the vertical arm $D_7$; and having a suitable recording or indicating mechanism $D_{11}$.

As explained in U. S. Patent No. 1,308, 626, the pivoted member $D_1$ $D_2$ $D_7$ $D_3$ is sensibly neutral when there is zero differential at the cylinders $D_1$ and $D_2$ and zero gauge pressure above the liquid beneath the bell $D_3$, that is, will exert of itself no sensible tendency to move to any particular position within its usual range of motion. This condition of neutrality of the balance with respect to its angular position has been described in detail in the patent referred to. It is obtained by so relating dimensions and weights of the different parts of the balance that flow of water (or other sealing liquid) between the cylinders $D_1$ and $D_2$ by reason of merely tipping the balance does not affect the equilibrium of the balance, in that the transfer of weight from one cylinder to the other results in a change in the turning or deflecting moment just balanced by a corresponding opposite change in the restoring moment from the shifting of the center of gravity of the balance, incident to the tipping.

In operation the deflecting moment is proportional to the differential pressure transmitted from the small orifice $B_5$ to the cylinders $D_1$ and $D_2$, and the restoring moment resisting deflection is simultaneously proportional to the deflection and to the suction under $D_3$ from the small orifice $B_2$, that is proportional to the product of the deflection by the suction under $D_3$.

The balance angularly deflects or turns upon its pivot to positions of equilibrium under the combined influences of the deflecting moment and of the restoring moment.

The deflecting moment, in view of the neutrality of the balance with respect to its position, is that impressed upon the upper cylinders, $D_1$ and $D_2$, by the differential pressure from the orifice $B_5$, and is directly proportional to this differential pressure and independent of the degree of deflection.

The restoring moment, that tending to return the balance to its mid position, is due to the suction beneath the bell $D_3$ from the orifice $B_2$, and is a direct function of the degree of suction and of the degree of deflection from mid position, in that the arm of the restoring moment varies directly with the deflection from mid position.

The balance is normally in substantial equilibrium, the restoring moment, except for a slight lag, maintaining equality with the deflecting moment, so that algebraically $M_1 = M_2$; $M_1 = KH$; $M_2 = K'H'f$; whence $KH = K'H'f$; $f = (K/K')(H/H')$, or $f = K''(H/H') = K''R$. In these expressions $M_1$ and $M_2$ are the deflecting and restoring moments respectively, $K$, $K'$ and $K''$ are constants, $H$ and $H'$ are the impressed differentials toward deflection and restoration respectively, $R$ is the ratio $H/H'$ between these differentials, and $f$ is the degree of deflection of the balance from its zero position.

The deflection of the balance is thus proportional to the ratio between the differential pressures transmitted from the orifices $B_5$ and $B_2$ which ratio is a function of the percentage of $CO_2$ in the stream of flue gas passing to the absorption chamber C, in that these differentials measure the same stream of flue gas with and without its $CO_2$, so that the deflection of the balance is a dependent function of the $CO_2$.

In adjusting the balance so that it may indicate $CO_2$ on a suitable chart or scale $D_{16}$, a blank is run with $CO_2$-free air and the adjusting counter-weight $D_{10}$ is screwed to the right or left until the pen $D_{11}$ indicates zero $CO_2$ on the scale of the chart.

The cylinders $D_1$ and $D_2$ are now by-passed making zero differential between these cylinders, the suction in the bell $D_3$ remaining unchanged. The adjusting counter-weight $D_{10}$ is now screwed to the right or left until the pen $D_{11}$ again reads zero $CO_2$ on the chart, careful note being made of the number of turns and fraction of a turn through which the counter-weight $D_{10}$ must be moved to accomplish this result.

With 20% $CO_2$ the ratio between the differentials at $B_5$ and $B_2$ will be about 0.58 as great as when there is zero $CO_2$, supposing the other gas present to be air or to have the density of air, as is sensibly true with ordinary flue gas.

The counter-weight $D_{10}$ is now screwed back 0.42 (or 1.00 minus 0.58) of the number of turns that were required to bring the pen again to zero after by-passing the cylinders. The pen should now indicate 20% $CO_2$ if the balance is in correct calibration, and if it does not indicate 20% $CO_2$, then the quantity of water in the stationary receptacle $D_9$ is altered until the pen does indicate 20% $CO_2$, after which the apparatus should be in correct calibration for recording $CO_2$ in the flue gas, the counter-weight $D_{10}$ being put back to its position for zero indication on a blank run of $CO_2$-free air.

Changing the quantity of liquid in the stationary receptacle $D_9$ changes the effective length of the arm of the moment exerted by the differential from the orifice $B_2$. In practice this adjustment of the quantity of liquid in the stationary receptacle $D_9$ should be within rather narrow limits, being merely such as is necessary to care for inexactness in duplication of dimensions of the ratio meter and of the orifices $B_2$ and $B_5$.

The ratio balance is responsive to variation in the ratio of the differential pressure across the small orifice $B_5$ to the suction under the bell $D_3$ and there may be wide change in the individual magnitudes of the differential and suction without any change whatever in the reading of the balance provided the ratio between them does not change.

In the arrangement of Figure 1 the suction under the bell will usually remain fairly constant by reason of the preferably fairly constant speed of the fan B; it will however vary somewhat with variation in the $CO_2$ content of the gas and also gradually change somewhat by reason of gradual change in the absorbing medium within the chamber C. Such variation in the suction does not however, either practically or theoretically, have any effect upon the indications of the balance.

If $CO_2$ is to be used to adjust air supply it is essential that there shall not be material lag between the condition in the flue or furnace and the indication of the recorder. A common fault with $CO_2$ recorders is a lag of magnitude too great to permit their use in any automatic control of air supply. In my improved apparatus lag is made extremely small by placing the fan A close to the absorption chamber, by making the piping between the fan A and the orifice $B^5$ of small bore and relatively short, and by making the absorption chamber C at the top taper to the pipe $B_4$ so that the volume of gas within the chamber may be very small, and a few seconds may suffice to bring a sample of flue gas from the flue to and through the absorption apparatus.

In practice the fans A and B may conveniently be on the same shaft.

The temperature of the flue gas should be the same at the orifice $B_3$ and at the orifice $B_5$ and to bring this about the coil $B_1$ is conveniently placed within the caustic chamber C, as in the figure.

An electric contact member F is adjustably attached to, and electrically insulated from, the vertical arm $D_7$ of the ratio meter at $F_2$, and has an arm $F_1$ passing downward through a vertical slot in a pivoted contact member G (see enlarged perspective detail, Fig. 2), G comprising upper and lower horizontal metal plates $G_1$ and $G_2$ and a vertical pivot $G_3$ electrically insulated from one another, the walls of the vertical slot affording electric contact between $G_1$ and $F_1$ at the top or between $G_2$ and $F_1$ at the bottom. The pivot member G is provided with suitable bearings $G_4$; the insulation between the plate $G_1$ and $G_2$ is shown at $G_5$ and the insulation between the pivot and the plates at $G_6$.

Deflection of the ratio balance impresses deflection on the contact member G by reason of the electric contact arm $F_1$ pressing against one side of the vertical slot through G. If the arm $F_1$ is inclined forward from the bottom upward then forward deflection of the ratio balance will give contact between $F_1$ and $G_1$ and backward deflection of the ratio balance will contact between $F_1$ and $G_2$, and vice versa, if the arm $F_1$ is inclined backward from the bottom up then forward deflection of the ratio balance will result in contact between $F_1$ and $G_2$ and backward deflection of the ratio balance will result in contact between $F_1$ and $G_1$.

The inclination of the arm $F_1$ varies with the position of the ratio balance as with the balance it deflects about the pivot $D_8$. The arm $F_1$ may be set vertical at any desired position of the ratio balance, as for example that corresponding to 14% $CO_2$ and if after thus having set $F_1$ vertical at this position, the balance is deflected forward, then $F_1$ becomes inclined backward from the bottom up and any forward deflection is accompanied by contact between $F_1$ and $G_2$ and deflection back accompanied by contact between $F_1$ and $G_1$ until the vertical position for $F_1$ is passed after which $F_1$ is inclined the other way and in going backward electric contact will be between $F_1$ and $G_2$; and on returning toward the position in which $F_1$ is vertical contact will be between $F_1$ and $G_1$.

A damper or distributing valve $P^4$ controlling the relative quantities of primary and secondary air to a furnace is connected as by means of a chain or rope $H^1$ to a float $H^2$ in such a way that the vertical height of the float $H^2$ determines the position of the damper. The float member $H^2$ floats within a float receptacle $H^3$ floating in a larger and fixed receptacle $H^4$.

$P^1$ is the air supply conduit for supplying the total air for combustion in the furnace under control. The furnace itself is not shown being in no way a direct part of my invention.

The supply conduit $P^1$ divides into distributing branches $P^2$ and $P^3$ for distributing the air to different parts of the furnace, these branches carrying respectively for example primary and secondary air.

Primary air is that entering the furnace through the incandescent fuel and reacts with the fuel to give combustion-products that are incompletely burned, and secondary air is that added after the first reaction to complete the combustion.

$P^4$ is a distributor or valve of distribution for controlling the distribution or relative quantities of air supplied through the branches $P^2$ and $P^3$, and has a port $P^5$ opening partly across both branches and the respective inlet areas into the branches is determined by the height of this valve so that by varying the height all or none or any desired portion of the total air may be directed to either branch.

The air distributor $P^4$ which thus controls the air distribution to the furnace, as for example the relative quantities of primary and secondary air, is operatively connected, as by means of a chain or wire $H^1$ over pulleys $H^5$, to the float $H^2$, so that the height of this float determines the air distribution to the furnace, that is determines the relative quantities of air through the branches $P^2$ and $P^3$.

In usual operation constant water pressure is supplied to the pipe $I_1$ before the valve $J_1$, $J_1$ being controlled by the motor K. The valve $J_2$ is closed and the valve $J_3$ is open, the pipe $I_3$ being of small bore so that even when the valve $J_3$ is open wide water discharge is throttled at the pipe $I_3$, causing a head of water in the receptacle $H_4$, the depth of this water depending on the quantity of water that must pass through the pipe $I_3$, as determined by the extent to which valve $J_1$ is open. The average height of the float $H_2$ depends upon this depth of water in the receptacle $H_4$, that is, upon the extent to which the valve $J_1$ is open. A continuous intermittent rise and fall is impressed on the float $H_2$, a small hole $H_5$ in the bottom of the float receptacle $H_3$ permitting this receptacle to gradually fill with water until an intermittent syphon $I_4$ overflows, when the water in the receptacle $H_3$ is quickly lowered, the water discharging through the flexible pipe $I_5$ into the waste pipe $I_6$, only again to gradually fill and quickly discharge, the operation of repeated gradual rise and fairly rapid fall being thus kept up continuously and automatically, irrespective of the depth of water in $H_4$.

It will be understood that an intermittent siphon is one that is self-starting whenever there is sufficient depth of liquid in the vessel and having a rate of discharge greater than the stream flowing into the vessel.

When the float $H_2$ is at the end of its gradual rise an electric circuit closes at L, the circuit being from the source of current M to L, through the conducting wire $L_1$ to the contact member F on the ratio balance, thence to $G_1$ or $G_2$ and the corresponding conducting wires $L_2$ or $L_3$ to the motor K controlling the water to the receptacle $H_4$.

The motor K, by controlling the opening and closure of the supply valve $J_1$, operates to increase or to diminish the head of water in the receptacle $H_4$ according as the circuit is through $G_2$ or $G_1$, thus, suppose the arm $F_1$ of the ratio balance is adjusted so that it is vertical when the ratio balance is in the position corresponding to 14% $CO_2$. Suppose the $CO_2$ in the flue gas to average about 10% and that when the circuit temporarily closes at L after the slow rise of the float $H_2$ the $CO_2$ in the flue gas, by reason of this gradual rise, is increasing in the flue gas causing the balance to move toward 14%, the actual reading however being perhaps 10%. The Arm $F_1$ will then slope in such a way as to make the contact with $G_1$, causing the motor K to slightly turn the valve $J_1$ in such a way as to increase the head of water in the receptacle $H_4$, thus changing the average height of the float $H_2$ in such direction as would result in greater percentage of $CO_2$ in the flue gas. If, on the other hand, the gradual rise of the float $H_2$ had resulted in a gradual fall in the percentage of $CO_2$, then electric contact would have been through $F_1$ to $G_2$ and the motor K would partially close the valve $J_1$ diminishing the average height of the float $H_2$ but changing this average height in the proper direction to result in an increase in the $CO_2$ in the flue gas.

The arrangement is one which every periodic adjustment of the valve $J_1$ by the motor K is in such direction as will result in an increase in percentage of $CO_2$ in the flue gas as long as this percentage is below 14%, and in direction such as will result in lower $CO_2$ whenever the percentage of $CO_2$ in the flue gas already exceeds 14%.

If it is desired at any time to quickly lower the float $H_2$ so as to quickly change the position of the damper controlling the relative quantities of primary and secondary air to the furnace, all that is necessary is to open the valve $J_2$ which will quickly empty the receptacle $H_4$; or if it is desired to quickly raise the float $H_2$ beyond its normal position, all that is necessary is to close the valve $J_3$ when the receptacle $H_4$ will fill with water to any desired height.

In practice it is sometimes convenient in order to obtain closer regulation at the valve $J_1$ to by-pass this valve with part of the flow to the pipe $I_2$, there being a suitable hand-valve in this by-pass.

The arrangement is one in which periodic adjustments are made to the damper, every adjustment being in such direction as will tend to bring about any desired percentage of $CO_2$ in the flue gas.

Referring to Fig. 3 representing the ratio meter as a "boiler efficiency" meter, the arrangement for the automatic control of the damper is not shown, being essentially the same as in Fig. 1, there being automatic periodic adjustment of the damper, each adjustment being in such direction as will tend to increase the ratio of heat output from the boiler to furnace input, that is to increase boiler efficiency. As all damper adjustments are to be such as will tend to make the balance gravitate in only one direction, that is toward a maximum, instead of toward some desired specific value, as with the balance connected as a $CO_2$ meter, the contact member G may conveniently be somewhat simplified, in that contact members $G_1$ and $G_2$ need each afford contact surface with $F_1$ (see Fig. 1) on only one side of the slot through G, contacts with G₁ and G₂ being respectively on opposite sides of the slot through G.

In view of the flue gas pressure before the boiler usually differing somewhat from atmospheric pressure it is necessary to have a different arrangement from that in Fig. 1 at the bell or inverted cup-shaped receptacle $D_3$. The bell $D_3$ hangs by a metal ribbon $D_{14}$ and is pivoted at a knife edge $D_{15}$ at the lower end of the vertical arm $D_7$. The stationary receptacle $D_9$ is covered by a lid $D_{12}$ with a narrow slot $D_{13}$ through which passes the metal ribbon $D_{14}$ suspending the bell $D_3$. This narrow slot $D_{13}$ is of a size just sufficient to permit the thin metal ribbon $D_{14}$ to deflect through its proper range of motion without touching the walls of the slot $D_{13}$. The pressure pipe $E_4$ gives pressure connection between the flue gas before it reaches the boiler and the space within $D_9$ above the bell $D_3$, and the size of this pressure pipe $E_4$ is relatively large as compared to the size of the clearance space through the lid $D_{12}$ at $D_{13}$ around the thin metal ribbon $D_{14}$, so that there is sensibly the same pressure in $D_9$ above the bell $D_3$ as in the flue gas before the boiler. The pipe $E_3$ gives pressure connection to the flue gas after it passes the boiler.

Claims:

1. In apparatus for automatically controlling the distribution of air to a furnace by successive automatic adjustments of a continuously operative air distributor, automatic means for slightly reciprocating the air distribution, and other automatic means responsive to furnace conditions for adjusting the distributor at intervals synchronous with the reciprocation.

2. In apparatus for automatically controlling the distribution of air to a furnace by successive automatic adjustments of a continuously operative air distributor, means for slowly oscillating the air distribution, mechanism responsive to furnace conditions, and an electric control of the adjustments operative by the mechanism at intervals synchronous with the oscillation.

3. In apparatus for automatically controlling the distribution of air to a furnace by successive automatic adjustments of a continuously operative air distributor, means for slowly oscillating the air distribution, mechanism responsive to furnace conditions, an electric control of the adjustments operative by the mechanism, a contact maker in the electric circuit of the control, and means for operating the contact maker at intervals synchronous with the oscillation.

4. In apparatus for automatically controlling the distribution of air to a furnace by successive automatic adjustments in the position of a continuously operative air distributor, means for slowly oscillating the distributor, mechanism responsive to furnace conditions, an electric control of the adjustments operative by the mechanism, a contact maker in the electric circuit of the control, and means operative by the oscillation of the distributor for operating the contact maker at one phase of the oscillation.

5. In apparatus for automatically controlling the distribution of air to a furnace by successive automatic adjustments in the position of a continuously operative air distributor, a float controlling the average position of the distributor, a fluid means for vertically positioning the float, means for slightly oscillating the air distribution, a valve continuously controlling the fluid means, mechanism responsive to furnace conditions, and an adjustor of the valve operated intermittently and synchronously with the oscillation by the mechanism.

6. In apparatus for automatically controlling the distribution of air to a furnace by successive automatic adjustments in the position of a continuously operative air distributor, means for slowly reciprocating the distribution of air, mechanism responsive to furnace conditions, and other means operative at intervals in phase with the reciprocation by motion of the mechanism and directionally controlled by the direction thereof for effecting the adjustments.

7. In apparatus for automatically controlling the distribution of air to a furnace by successive automatic adjustments in the position of a continuously operative air distributor, means for slowly reciprocating the distribution of air, a contact maker, other means for operating the contact maker at intervals synchronous with the reciprocations, a contact maker and changer responsive to furnace conditions, and an electric circuit for controlling and effecting the adjustments and including the contact maker and contact maker and changer.

8. In apparatus for automatically controlling the distribution of air to a furnace by successive automatic adjustments in the position of a continuously operative air distributor, means for slowly reciprocating the distributor, a contact maker intermittently operative by the distributor and in phase with the reciprocation thereof, a contact maker and changer responsive to furnace conditions, and an electric circuit for controlling and effecting the adjustments and including the contact maker and the contact maker and changer.

9. In apparatus for automatically controlling the distribution of air to a furnace by successive automatic adjustments in the position of a continuously operative air distributor, means for impressing small and slow reciprocation upon the air distribution, a contact maker periodically operative and operative at intervals in phase with the reciprocation, a contact maker and changer responsive to furnace conditions, adjustable other means for automatically reversing the operation of the contact maker and changer at its position that corresponds to desirable furnace conditions, and an electric circuit for controlling and effecting the adjustments that includes the contact maker and the contact maker and changer.

10. In apparatus for automatically controlling the distribution of air to a furnace by successive automatic adjustments of an air distributor, means for impressing small and slow reciprocation upon the distributor, a contact maker operative intermittently by the distributor and at intervals in phase with the reciprocation, a contact maker and changer responsive to furnace conditions, adjustable other means for automatically reversing the operation of the contact maker and changer at its position that corresponds to desirable furnace conditions, and an electric circuit for controlling and effecting the adjustments and including the contact maker and the contact maker and changer.

11. In apparatus for automatically controlling the distribution of air to a furnace by successive automatic adjustments of an air distributor, means for impressing small and slow reciprocation upon the air distribution, a pivoted member angularly responsive to furnace conditions, and means for using periodically and at intervals in phase with the reciprocation the direction of motion of the pivoted member to control and effect the adjustments.

12. In apparatus for automatically controlling the distribution of air to a furnace by successive automatic adjustments of a continuously operative air distributor, means for impressing small and slow reciprocation upon the distributor, a pivoted member angularly responsive to furnace conditions, and means for using periodically and at intervals in phase with the reciprocation the direction of motion of the pivoted member to control and effect the adjustments.

13. In apparatus for automatically controlling the distribution of air to a furnace by successive automatic adjustments of a continuously operative air distributor, means for impressing small and slow reciprocation upon air distribution, a pivoted contact member angularly responsive to furnace conditions, a contact maker closed periodically and at intervals in phase with the reciprocation, and an electric circuit including the contact member and the contact maker and through a path determined by the direction of angular motion of the contact member at closure of the contact maker and for controlling and effecting the adjustments.

14. In apparatus for automatically controlling the distribution of air to a furnace by successive automatic adjustments to the position of a continuously operative air distributor, means for impressing small and slow reciprocation upon the distributor, a pivoted contact member angularly responsive to furnace conditions, a contact maker closed periodically and at intervals synchronous with the reciprocation, and an electric circuit including the contact member and the contact maker and through a path determined by the direction of angular motion of the pivoted contact member at closure of the contact maker and for controlling and effecting the adjustments.

15. In apparatus for automatically controlling the distribution of air to a furnace by successive automatic adjustments of distribution, an air distributor, and means for impressing small and slow reciprocation upon the distributor comprising a float positioning the distributor, a vessel within which the float operates, an inlet adapted to continuously pass a small stream of liquid into the vessel, and an intermittent syphon discharge adapted intermittently to discharge a relatively large stream of liquid from the vessel.

16. In apparatus for automatically controlling the distribution of air to a furnace by successive automatic adjustment in air distribution, an air distributor, a fluid container adapted to contain different depths of fluid, a fluid connection thereto, a floating vessel within the container having a small fluid inlet beneath the level of the fluid within the container, a flexible intermittent syphon discharge from the vessel to without the container and adapted by its flexibility to permit rise and fall of the vessel, a float within the vessel intermittently rising and falling by reason of the continuous flow through the inlet and intermittent discharge from the flexible syphon, operative connection between the float and the distributor, and means operative by the changing furnace conditions at intervals synchronous with the intermittent motion of the float for controlling and adjusting the depth of fluid within the container.

17. In apparatus for automatically controlling the distribution of air to a furnace by successive automatic adjustment in air distribution, an air distributor, a water container adapted to contain different depths of water, a water connection thereto, an inlet valve thereto, a throttled discharge thereafter, a floating vessel within the container having a small water inlet beneath the level of the water without the vessel and within the container, a flexible intermittent syphon from the vessel to discharge without the container and adapted intermittently to materially lower the water within the vessel and adapted by its flexibility to permit vertical variation in the height of the vessel with change in depth of water within the container, a float within the vessel intermittently rising and falling by reason of the continuous flow through the inlet and intermittent discharge through the syphon, operative connection between the float and distributor, a contact maker operative at intervals periodically synchronous with the intermittent motion of the float, a contact maker and changer responsive to furnace conditions, and an electric circuit for adjusting the inlet valve and including the contact maker and contact maker and changer.

WILLIAM JAMES CROWELL, JR.